(12) United States Patent
Porter et al.

(10) Patent No.: US 7,878,933 B2
(45) Date of Patent: *Feb. 1, 2011

(54) HYDRAULIC COUPLING WITH DISCONNECT PUMP CLUTCH

(75) Inventors: Fred C. Porter, The Valley (AI); Todd Ekonen, Howell, MI (US); Thomas C. Bowen, Rochester Hills, MI (US)

(73) Assignee: MAGNA Powertrain USA, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/491,411

(22) Filed: Jun. 25, 2009

(65) Prior Publication Data

US 2009/0258751 A1    Oct. 15, 2009

Related U.S. Application Data

(63) Continuation of application No. 11/489,217, filed on Jul. 19, 2006, now Pat. No. 7,568,568.

(60) Provisional application No. 60/716,717, filed on Sep. 13, 2005.

(51) Int. Cl.
*B60K 17/35* (2006.01)
*F16H 48/22* (2006.01)
*F16D 25/02* (2006.01)

(52) U.S. Cl. .............. 475/88; 192/85.02; 192/85.24; 180/249

(58) Field of Classification Search .............. 192/85.02; 475/88

See application file for complete search history.

(56) References Cited

U.S. PATENT DOCUMENTS

| 5,310,388 | A | 5/1994 | Okcuoglu et al. |
| 5,827,145 | A | 10/1998 | Okcuoglu |
| 6,378,682 | B1 | 4/2002 | Mohan et al. |
| 6,626,787 | B2 | 9/2003 | Porter |
| 7,361,114 | B2 | 4/2008 | Boddy |
| 7,452,301 | B2 | 11/2008 | Yoshioka |
| 7,549,941 | B2 | 6/2009 | Boddy |
| 7,568,568 | B2 * | 8/2009 | Porter et al. .................. 192/35 |
| 2003/0173179 | A1 * | 9/2003 | Gratzer ..................... 192/3.57 |
| 2004/0168875 | A1 | 9/2004 | Dolan |
| 2007/0056823 | A1 | 3/2007 | Ekonen et al. |

* cited by examiner

*Primary Examiner*—Richard M. Lorence
(74) *Attorney, Agent, or Firm*—Harness, Dickey & Pierce, P.L.C.

(57) ABSTRACT

A power transfer assembly for use in a motor vehicle and having a hydraulic coupling operable to transfer drive torque to a driveline in response to slip. The hydraulic coupling includes a transfer clutch, a clutch operator for engaging the transfer clutch, a fluid actuation system including a fluid pump for controlling movement of the clutch operator, and a magnetorheological pump clutch capable of selectively shifting the fluid pump between operative and inoperative states.

29 Claims, 13 Drawing Sheets

HYDRAULIC COUPLING WITH DISCONNECT PUMP CLUTCH

CROSS-REFERENCE TO RELATED APPLICATIONS

This application is a continuation of U.S. patent application Ser. No. 11/489,217 filed on Jul. 19, 2006, now U.S. Pat. No. 7,568,568, which claims the benefit of U.S. Provisional Application Ser. No. 60/716,717 filed Sep. 13, 2005. The entire disclosures of each of the above applications are incorporated herein by reference.

FIELD OF THE INVENTION

The present invention relates generally to hydraulic couplings for use in motor vehicle driveline applications for limiting slip and/or transferring torque between rotary members. More specifically, a power transfer assembly for a motor vehicle is disclosed to include a hydraulic coupling having a fluid pump, a multi-plate clutch assembly coupled between a pair of rotary members, a fluid distribution system with a control valve operable to control actuation of the clutch assembly and a pump clutch for selectively shifting the fluid pump between operative and inoperative states.

BACKGROUND OF THE INVENTION

Hydraulic couplings are used in a variety of motor vehicle driveline applications for limiting slip and transferring drive torque between a pair of rotary members. In 4WD and AWD applications, hydraulic couplings are used to control the transfer of drive torque from a driven member to a non-driven member in response to speed differentiation therebetween. In limited slip applications, such as used in association with a differential in an axle assembly, a full-time transfer case or a transaxle, hydraulic couplings have been used to limit slip and bias the torque split between a pair of driven rotary members. Examples of known hydraulic couplings that are adapted for use in such driveline applications include viscous couplings, geared traction units and hydraulically-actuated friction clutches.

One type of hydraulic coupling that has proven to be successful in many driveline applications includes a gerotor pump which generates hydraulic pressure to engage a multi-plate friction clutch in response to and as a function of the speed differentiation between the rotary members. Examples of such hydraulic couplings are disclosed in U.S. Pat. Nos. 5,310,388 and 5,827,145. Commonly-owned U.S. Pat. Nos. 6,378,682 and 6,626,787 each disclose an improved version of such a hydraulic coupling that is equipped with a control valve for automatically releasing engagement of the friction clutch in response to the occurrence of an over-pressure or over-temperature condition. However, a need still exists to provide means for releasing engagement of the friction clutch in coordination with actuation of certain brake-based vehicle control systems such as, for example, anti-lock brake systems and/or electronic stability control systems.

SUMMARY OF THE INVENTION

Accordingly, it is an objective of the present invention to provide a hydraulic coupling capable of releasing engagement of a friction clutch in response to actuation of a brake-based vehicle control system.

It is another objective of the present invention to provide a hydraulic coupling having a gerotor pump, a friction clutch, a clutch actuator operable to engage the friction clutch based on the output of the gerotor pump, a pump clutch for selectively shifting the gerotor pump between an operative state and an inoperative state and a control system for controlling actuation of the pump clutch.

It is another objective of the present invention to provide the hydraulic coupling with a magnetorheological pump clutch that is operable to couple a pump member to a driven rotary component when the gerotor pump is operating in its operative state and to uncouple the pump component from the driven rotary component when the gerotor pump is in its inoperative state.

According to one embodiment of the present invention, a drive axle assembly for use in an all-wheel drive vehicle has a first hydraulic coupling operable to automatically transfer drive torque to a secondary driveline in response to slip of the primary driveline and a second hydraulic coupling operable to bias torque and limit slip between the wheels of the secondary driveline. The drive axle assembly includes a differential drive module and a pinion shaft with the first hydraulic coupling operably disposed between a driven propshaft and the pinion shaft. The differential drive module includes a drive case driven by the pinion shaft and a differential unit operably interconnecting the drive case to a pair of axleshafts. The second hydraulic coupling is operably disposed between the drive case and one of the axleshafts.

The first hydraulic coupling includes a multi-plate friction clutch, a clutch actuator, a fluid pump and a pump clutch. The fluid pump is operable for pumping fluid in response to a speed differential between the pinion shaft and the propshaft. The clutch actuator includes a piston retained for sliding movement in a piston chamber and a multi-function control valve. The pump supplies fluid to the piston chamber such that a clutch engagement force exerted by the piston on the multi-plate friction clutch is proportional to the fluid pressure in the piston chamber. The control valve is mounted to the piston and can provide a pressure relief function for setting a maximum fluid pressure within the piston chamber. The control valve can also provide a thermal unload function for releasing the fluid pressure within the piston chamber when the fluid temperature exceeds a predetermined temperature value. The pump clutch is operable for releasably coupling a rotary pump component to one of the pinion shaft and the propshaft.

BRIEF DESCRIPTION OF THE DRAWINGS

Further objects, features and advantages of the present invention will become readily apparent from the following detailed specification and the appended claims which, in conjunction with the drawings, set forth the best mode now contemplated for carrying out the invention. Referring to the drawings:

DETAILED DESCRIPTION OF THE PREFERRED EMBODIMENTS

In general, a hydraulic coupling according to the present invention is shown incorporated into a power transfer assembly, hereinafter referred to as a drive axle assembly, for use in connecting a drivetrain to a pair of axleshafts associated with a secondary driveline of an all-wheel drive vehicle. However, the hydraulic coupling of the present invention can be installed in other power transfer devices for use in driveline applications including, but not limited to, limited slip differentials of the type used in full-time transfer cases and front-wheel drive transaxles. Furthermore, this invention advances the technology in the field of hydraulically-actuated couplings of the type requiring pressure relief and thermal unloading to prevent damage to the driveline components and use in cooperation with brake-based vehicle control systems.

Figure 1:
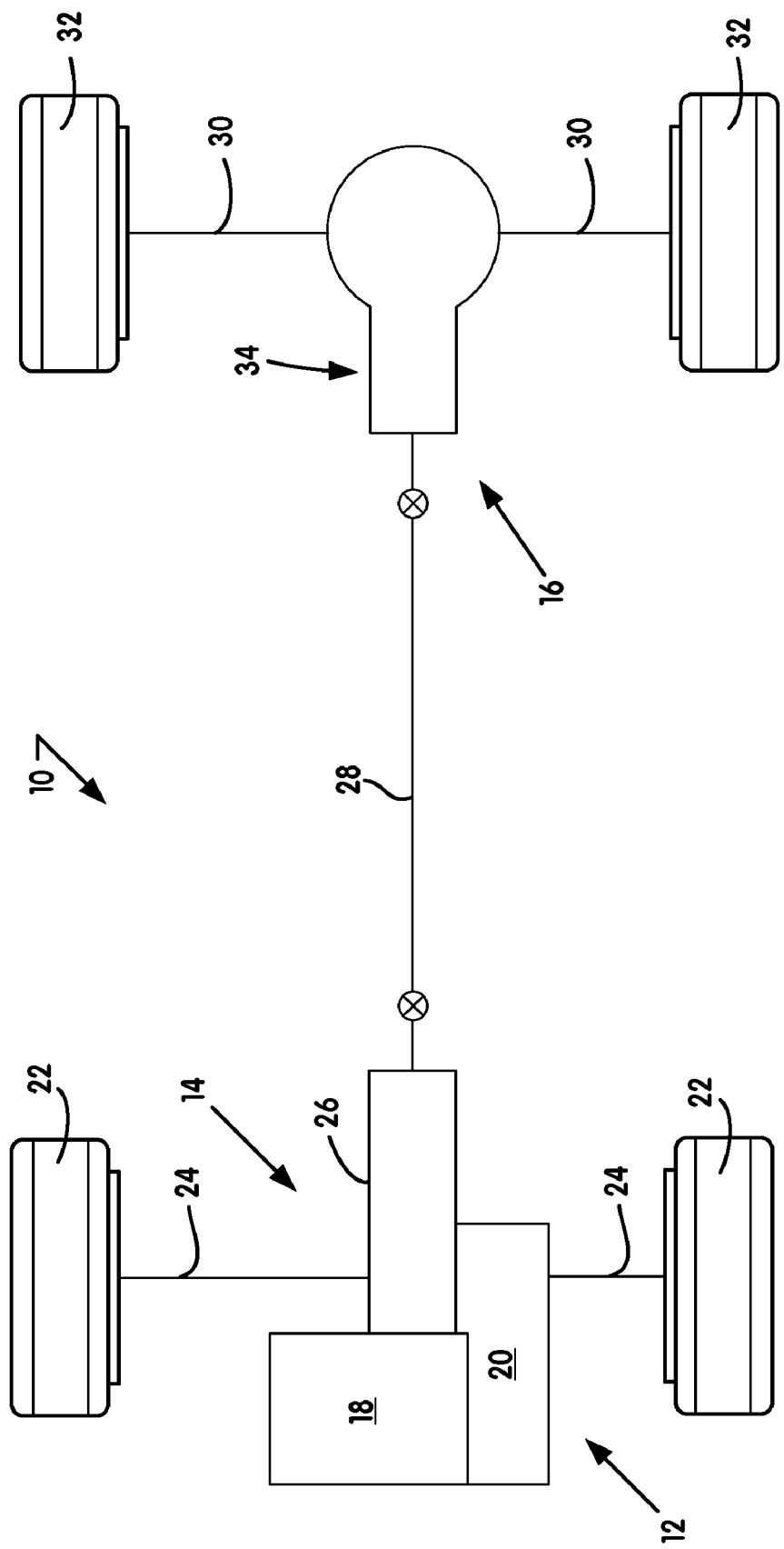
FIG. 1 is a schematic view of a motor vehicle drivetrain equipped with a drive axle assembly constructed in accordance with the present invention.
Figure 2:
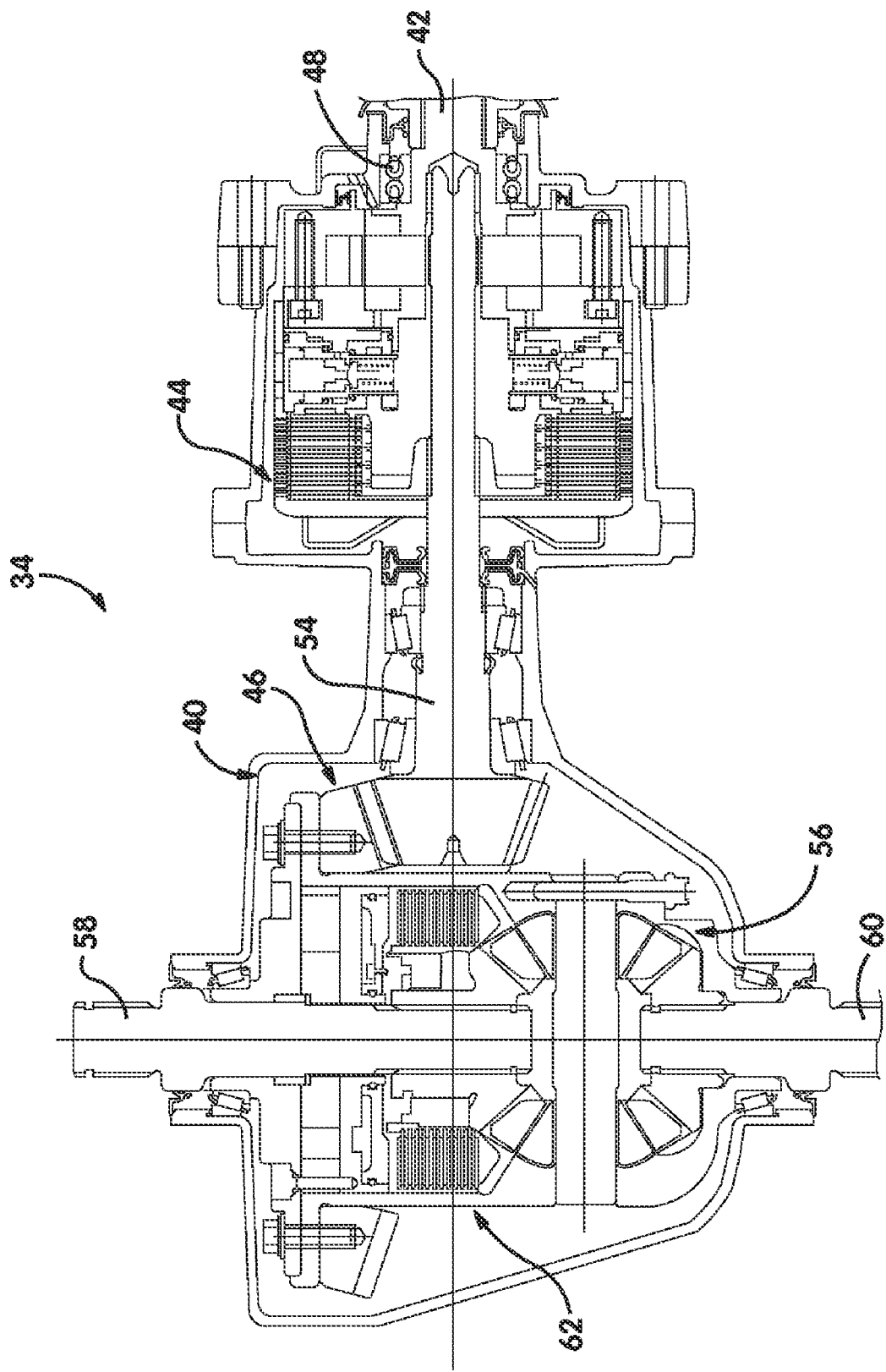
FIG. 2 is a sectional view of a portion of the drive axle assembly of the present invention.
Figure 3:
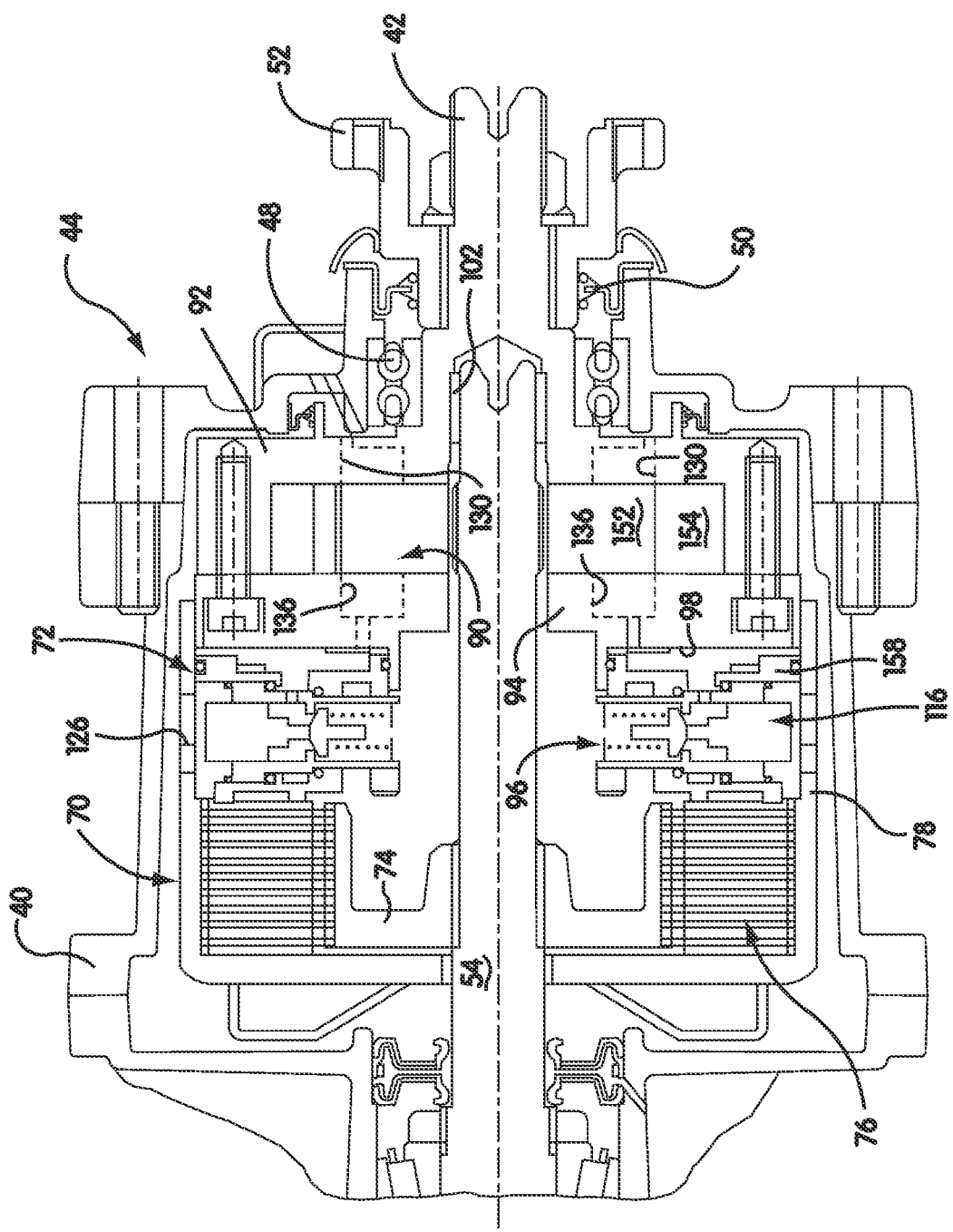
FIG. 3 is a sectional view of an on-demand hydraulic coupling associated with the drive axle assembly.
Figure 4:
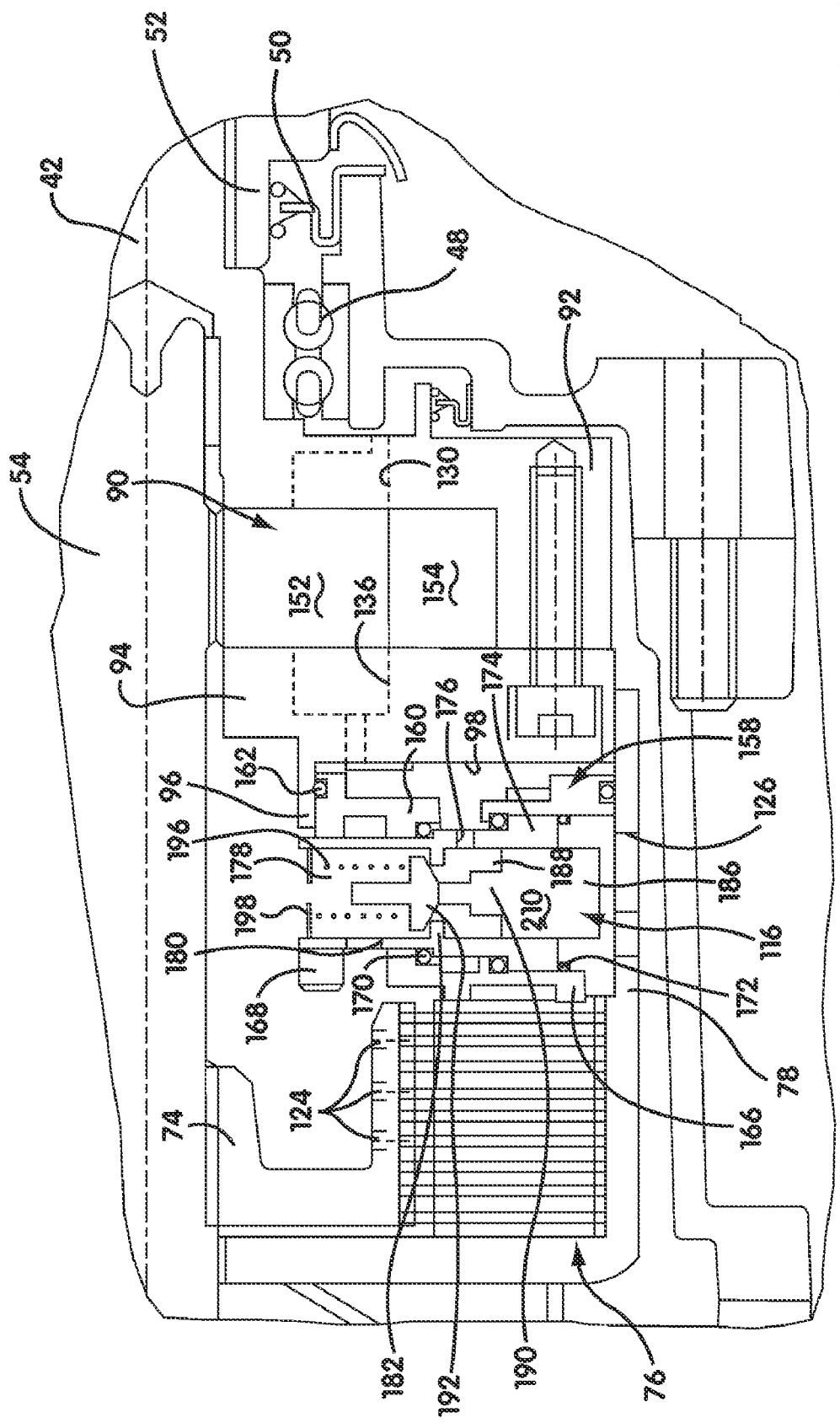
FIG. 4 is an enlarged partial view taken from FIG. 3 showing components of the hydraulic coupling in greater detail.

With reference to FIG. 1, a schematic layout for a vehicular drivetrain 10 is shown to include a powertrain 12 driving a first or primary driveline 14 and a second or secondary driveline 16. Powertrain 12 includes an engine 18 and a transaxle 20 arranged to provide motive power (i.e., drive torque) to a pair of wheels 22 associated with primary driveline 14. Primary driveline 14 further includes a pair of axleshafts 24 connecting wheels 22 to a differential assembly (not shown) associated with transaxle 20. Secondary driveline 16 includes a power take-off unit (PTU) 26 driven by transaxle 20, a propshaft 28 driven by PTU 26, a pair of axleshafts 30 connected to a pair of wheels 32, and a drive axle assembly 34 operable to transfer drive torque from propshaft 28 to axleshafts 30.

Referring to FIGS. 2 through 7, the components associated with drive axle assembly 34 will be now detailed. Drive axle assembly 34 includes a multi-piece housing 40, an input shaft 42, a first hydraulic coupling 44 and a differential drive module 46. Input shaft 42 is rotatably supported in housing 40 by a bearing assembly 48 and sealed relative thereto via a seal assembly 50. A yoke 52 is secured to input shaft 42 and is adapted for connection to propshaft 28. Drive module 46 includes a pinion shaft 54, a bevel-type differential gearset 56, a pair of output shafts 58 and 60 adapted for connection to axleshafts 30, and a second hydraulic coupling 62. In operation, first hydraulic coupling 44 is operable to selectively transfer drive torque from input shaft 42 to pinion shaft 54 in response to excessive interaxle speed differentiation between propshaft 28 and differential gearset 56. In addition, second hydraulic coupling 62 is operable to limit intra-axle slip in response to excessive speed differentiation between output shafts 58 and 60.

First hydraulic coupling 44 includes a friction clutch 70 and a clutch actuator 72. Friction clutch 70 is a multi-plate clutch assembly including a clutch hub 74 fixed (i.e., splined) to pinion shaft 54 and a clutch pack 76 of interleaved inner and outer clutch plates that are respectively splined to hub 74 and a clutch drum 78. Clutch actuator 72 includes a fluid pump 90 disposed in a pump chamber formed between a pump housing 92 and a piston housing 94, and a piston assembly 96 retained in an annular piston chamber 98 formed in piston housing 94. As seen, pump housing 92 is fixed for rotation with input shaft 42 while piston housing 94 is likewise fixed to pump housing 92. Also, clutch drum 78 is fixed to piston housing 94. A bearing unit 102 supports pinion shaft 54 for rotation relative to pump housing 92.

Piston assembly 96 is supported for axial sliding movement in piston chamber 98 for applying a compressive clutch engagement force on clutch pack 76, thereby transferring drive torque and limiting relative rotation between input shaft 42 and pinion shaft 54. The amount of torque transferred is progressive and is proportional to the magnitude of the clutch engagement force exerted by piston assembly 96 on clutch pack 76 which, in turn, is a function of the fluid pressure within piston chamber 98. Moreover, the fluid pressure generated by pump 90 and delivered to piston chamber 98 is largely a function of the speed differential between propshaft 28 and pinion shaft 54.

Figure 5:
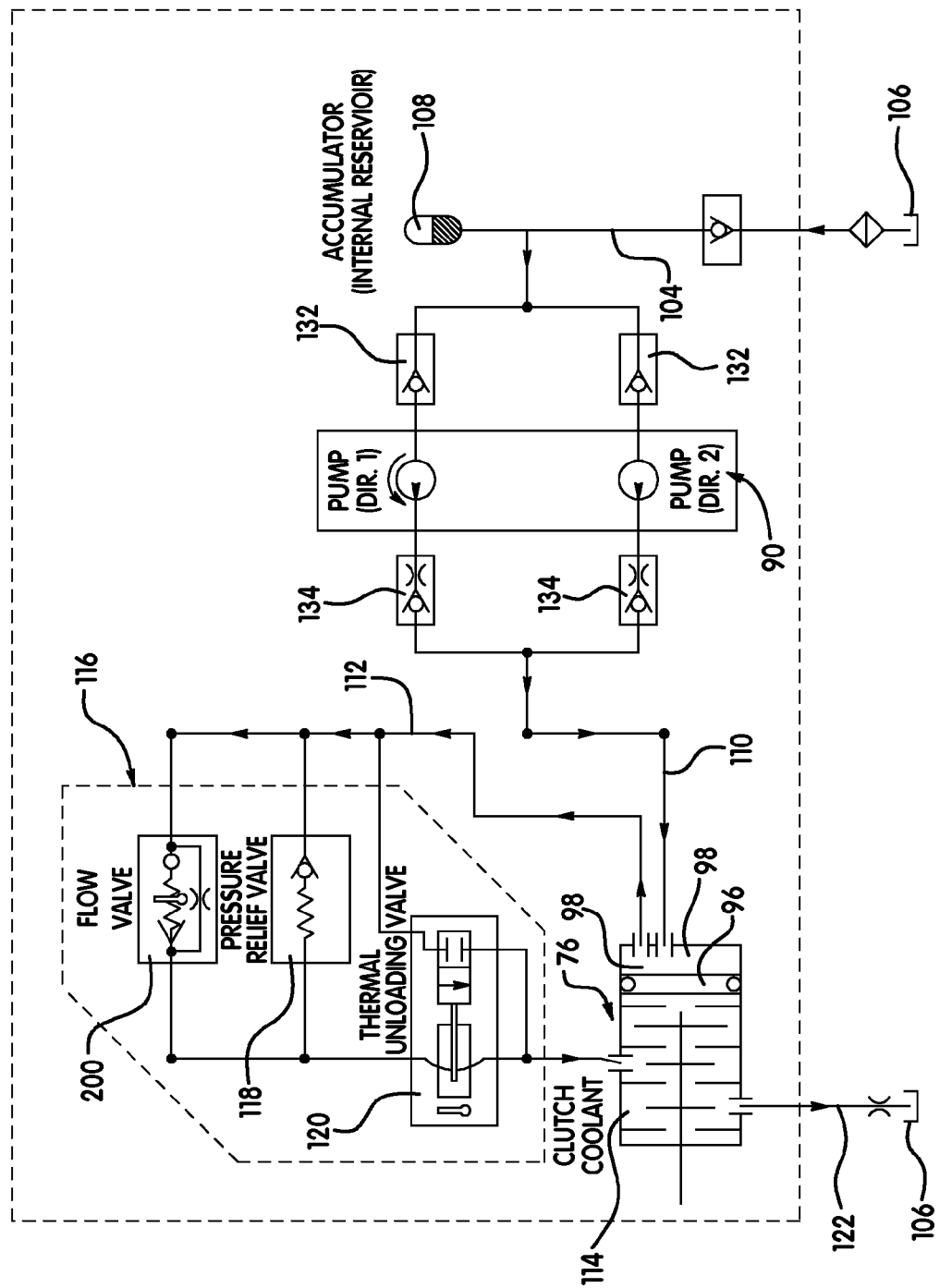
FIG. 5 is a schematic diagram illustrating a hydraulic control circuit associated with the on-demand hydraulic coupling shown in FIG. 3.

With particular reference to FIG. 5, a fluid distribution and valving arrangement is shown for controlling the delivery of fluid to piston chamber 98. The fluid distribution system includes a first flow path 104 for supplying hydraulic fluid from a sump 106 to an internal reservoir 108 located at the inlet or suction side of fluid pump 90, and a second flow path 110 for supplying fluid from the discharge or outlet side of pump 90 to piston chamber 98. A third flow path 112 extends through piston assembly 96 for venting fluid from piston chamber 98 into a clutch chamber 114 in close proximity to clutch pack 76. A multi-function control valve 116 forms part of piston assembly 96 and provides at least two functional modes of operation. The first mode, hereinafter referred to as its pressure relief function, is schematically illustrated by a pressure relief valve 118. The second mode of operation, hereinafter referred to as its thermal unload function, is schematically indicated by a thermal unload valve 120. With each function, fluid discharged from piston chamber 98 is delivered to clutch chamber 114 for cooling clutch pack 76 and is then returned to sump 106 via a fourth flow path 122. According to the structure shown, lubrication slots 124 formed in hub 74 and exhaust ports 126 formed in drum 78 define fourth flow path 122.

First flow path 104 is defined by a pair of inlet ports 130 formed through pump housing 92. A one-way check valve 132 is provided for selectively opening and closing each of inlet ports 130. Specifically, one-way check valves move between "open" and "closed" positions in response to the direction of pumping action generated by fluid pump 90. Rotation of the pump components in a first direction acts to open one of check valves 132 and to close the other for permitting fluid to be drawn from sump 106 into inlet reservoir 108. The opposite occurs in the case of pumping in the reverse rotary direction, thereby assuring bi-directional operation of pump 90. Check valves 132 are preferably reed-type valves mounted on rivets secured to pump housing 92. Check valves 132 are of the normally-closed type to maintain fluid within inlet reservoir 108.

A valving arrangement associated with second flow path 110 includes a second pair of one-way check valves 134 that are located in a pair of flow passages 136 formed in piston housing 94 between the outlet of pump 88 and piston chamber 98. As before, the direction of pumping action establishes which of check valves 134 is in its "open" position and which is in its "closed" position to deliver pump pressure to piston chamber 98. Upon cessation of pumping action, both check valves 134 return to their closed position to maintain fluid pressure in piston chamber 98. Thus, check valves 134 are also of the normally-closed variety.

As noted, fluid pump 90 is operable for pumping hydraulic fluid into piston chamber 98 to actuate friction clutch 70. Fluid pump 90 is bi-directional and is capable of pumping fluid at a rate proportional to speed differential between its pump components. In this regard, pump 90 is shown as a gerotor pump assembly having a pump ring 152 that is fixed (i.e., keyed or splined) to pinion shaft 54, and an eccentric stator ring 154 that is retained in an eccentric chamber formed in pump housing 92. Pump ring 152 has a plurality of external lobes that rotate concentrically relative to pinion shaft 54 about a common rotational axis. Stator ring 154 includes a plurality of internal lobes and has an outer circumferential edge surface that is journally supported within a circular internal bore formed in pump housing 92. The internal bore is offset from the rotational axis such that, due to meshing of internal lobes of stator ring 154 with external lobes of pump ring 152, relative rotation between pump ring 152 and eccentric stator ring 154 causes eccentric rotation of stator ring 154. It will be understood that fluid pump 90 can be any type of mechanical pump capable of generating pumping action due to a speed differential.

Piston assembly 96 is shown to include a piston 158 and control valve 116. Piston 158 includes a radial web segment 160 sealed by seal ring 162 for movement relative to piston housing 94. Piston 158 further includes one or more circumferential rim segments 166 extending from web segment 160 and which engages clutch pack 76. Piston 158 further defines a cup segment 168 within which control valve 116 is retained. Seal rings 170 are provided to seal control valve 116 relative to cup segment 168 and a circlip 172 is provided to retain control valve 116 in cup segment 168. Control valve 116 includes a tubular housing 174 defining a series of inlet ports 176 and a valve chamber 178 having a series of outlet ports 180. Inlet ports 176 and valve chamber 178 are delineated by a rim section 182 having a central valve aperture formed therethrough. A thermal actuator 186 is retained in pressure chamber 188 of housing 174 and includes a post segment 190. A head segment of a valve member 192 is seated against the valve aperture and engages the terminal end of post segment 190. A spring 196 mounted between an end cap 198 and valve member 192 is operable to bias valve member 192 against the seat surface defined by the valve aperture for normally preventing fluid flow from inlet ports 176 to outlet ports 180. Control valve 116 is arranged such that inlet ports 176 communicate with piston chamber 98 with valve member 192 directly exposed to the fluid pressure in piston chamber 98.

Hydraulic coupling 72 also includes a flow regulator 200 which is operable for setting the predetermined minimum pressure level within piston chamber 98 at which friction clutch 70 is initially actuated and which is further operable to compensate for temperature gradients caused during heating of the hydraulic fluid. Preferably, flow regulator 200 is a reed-type valve member secured to piston assembly 96 such that its terminal end is normally maintained in an "open" position displaced from a by-pass port 202 formed through piston 158 for permitting by-pass flow from piston chamber 94 to clutch chamber 114. During low-speed relative rotation, the pumping action of fluid pump 90 causes fluid to be discharged from piston chamber 94 through the by-pass port into clutch chamber 114. Flow regulator 200 is preferably a bimetallic valve element made of a laminated pair of dissimilar metallic strips having different thermal coefficients of expansion. As such, the terminal end of the valve element moves relative to its corresponding by-pass port regardless of changes in the viscosity of the hydraulic fluid caused by temperature changes. This thermal compensation feature can be provided by one or more bimetallic valves. However, once the fluid in piston chamber 98 reaching its predetermined pressure level, the terminal end of the bimetallic valve element will move to a "closed" position for inhibiting fluid flow through the by-pass port. This flow restriction causes a substantial increase in the fluid pressure within piston chamber 98 which, in turn, causes piston 158 to move and exert a large engagement force on clutch pack 86. A bleed slot (not shown) is formed in one of the by-pass port or bimetallic valve element and permits a small amount of bleed flow even when the flow regulator is in its closed position for gradually disengaging friction clutch 70 when fluid pump 90 is inactive.

The pressure relief function of control valve 116 occurs when the fluid pressure in piston chamber 98 is greater than that required to close bimetallic flow regulator 200 but less than a predetermined maximum value. In this pressure range, the bias of spring 196 is adequate to maintain valve member 192 seated against the aperture such that fluid is prevented from flowing from piston chamber 94 through outlet ports 180. However, when the fluid pressure in piston chamber 98 exceeds this maximum value, valve member 192 is forced to move in opposition to the biasing of spring 196. As such, fluid in piston chamber 98 is permitted to flow through the aperture into valve chamber 178 from where it is discharged from outlet ports 180. The fluid discharged from outlet ports 180 circulates in clutch chamber 114 to cool clutch pack 76 and is directed to flow across actuator section 210 of thermal actuator 186 prior to discharge to pump through exhaust ports 126 in drum 78. Use of this pressure relief function torque limits hydraulic coupling 44 and prevents damage thereto.

The thermal unload function is actuated when the fluid temperature detected by actuator section 210 of thermal actuator 186 exceeds a predetermined maximum value. In such an instance, post segment 190 moves from its retracted position shown to an extended position for causing valve member 192 to move away from seated engagement against aperture (or maintain valve member 192 in its displaced position during pressure relief) and permit fluid in pressure chamber 98 to vent into clutch chamber 114, thereby disengaging friction clutch 70. Once piston chamber 98 has been unloaded, the fluid and thermal actuator 186 will eventually cool to a temperature below the predetermined value, whereby post segment 190 will return to its retracted position for resetting the thermal unload function. Thermal actuator 186 is of a type manufactured by Therm-Omega Tech of Warminster, Pa. or Standard-Thomson of Waltham, Mass.

Figure 6:
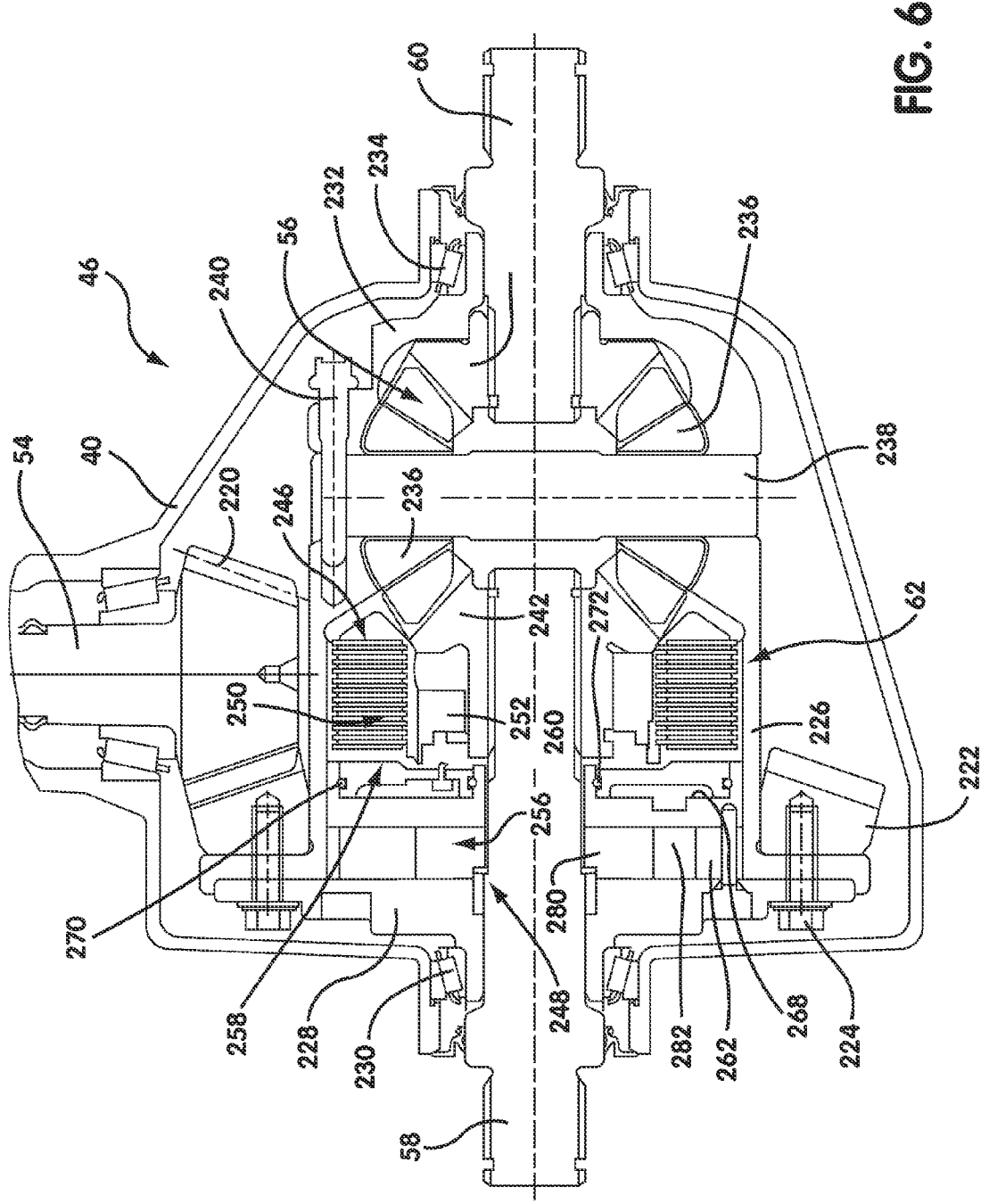
FIG. 6 is a sectional view of a differential drive module associated with the drive axle of the present invention.
Figure 7:
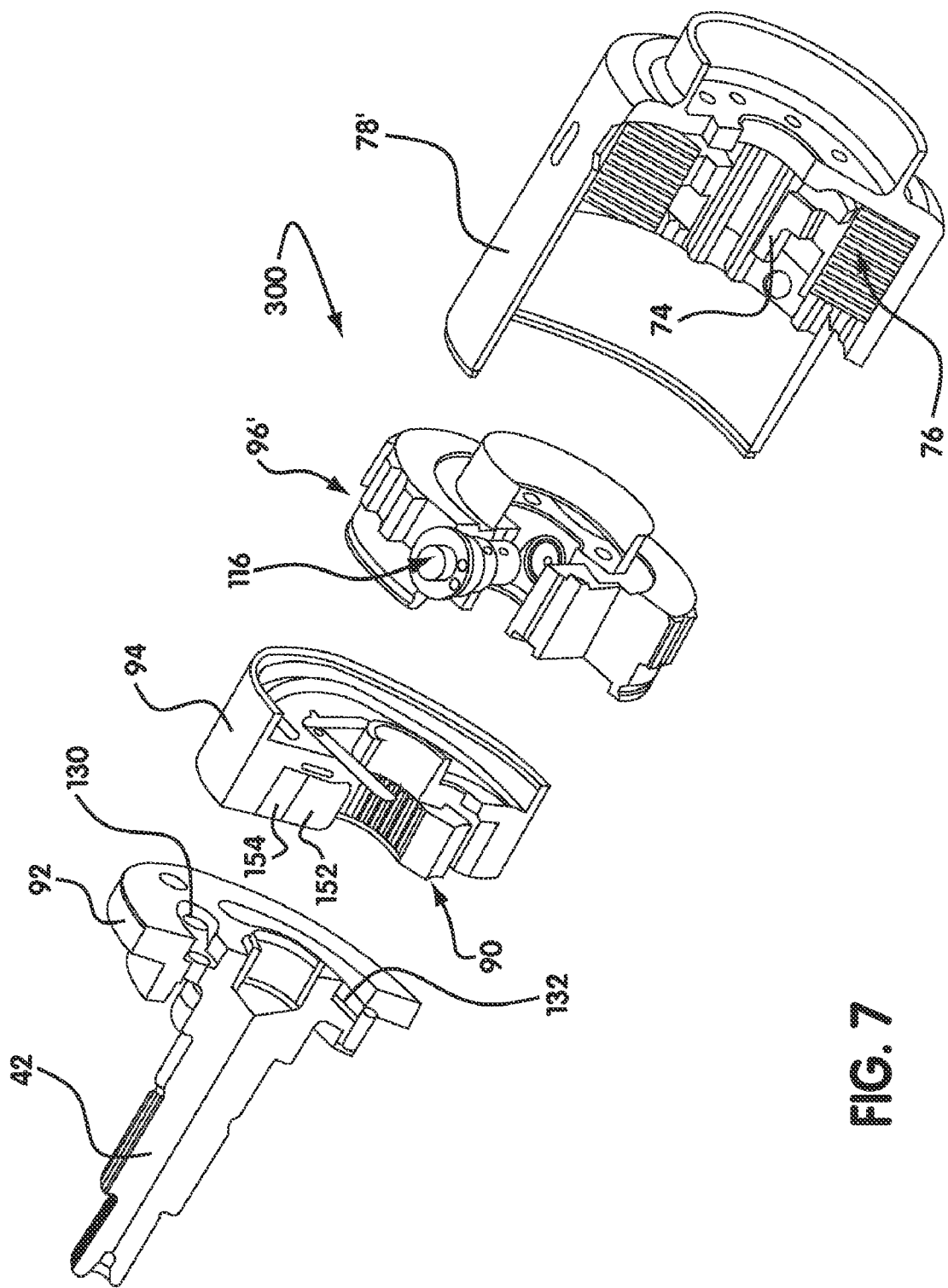
FIGS. 7 through 10 are various exploded and sectional perspective views of a slightly modified version of the on-demand hydraulic coupling.
Figure 8:
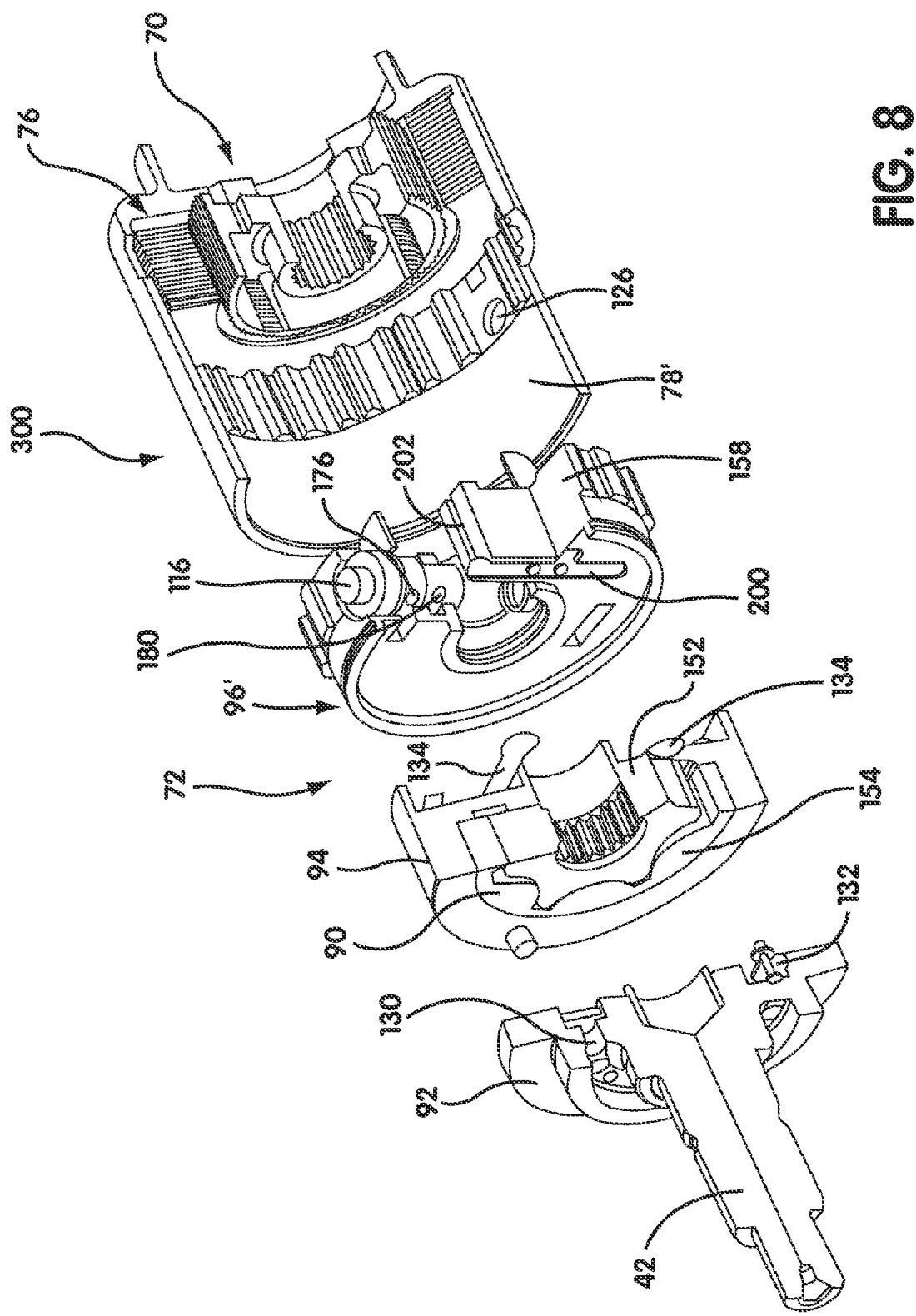
Figure 9:
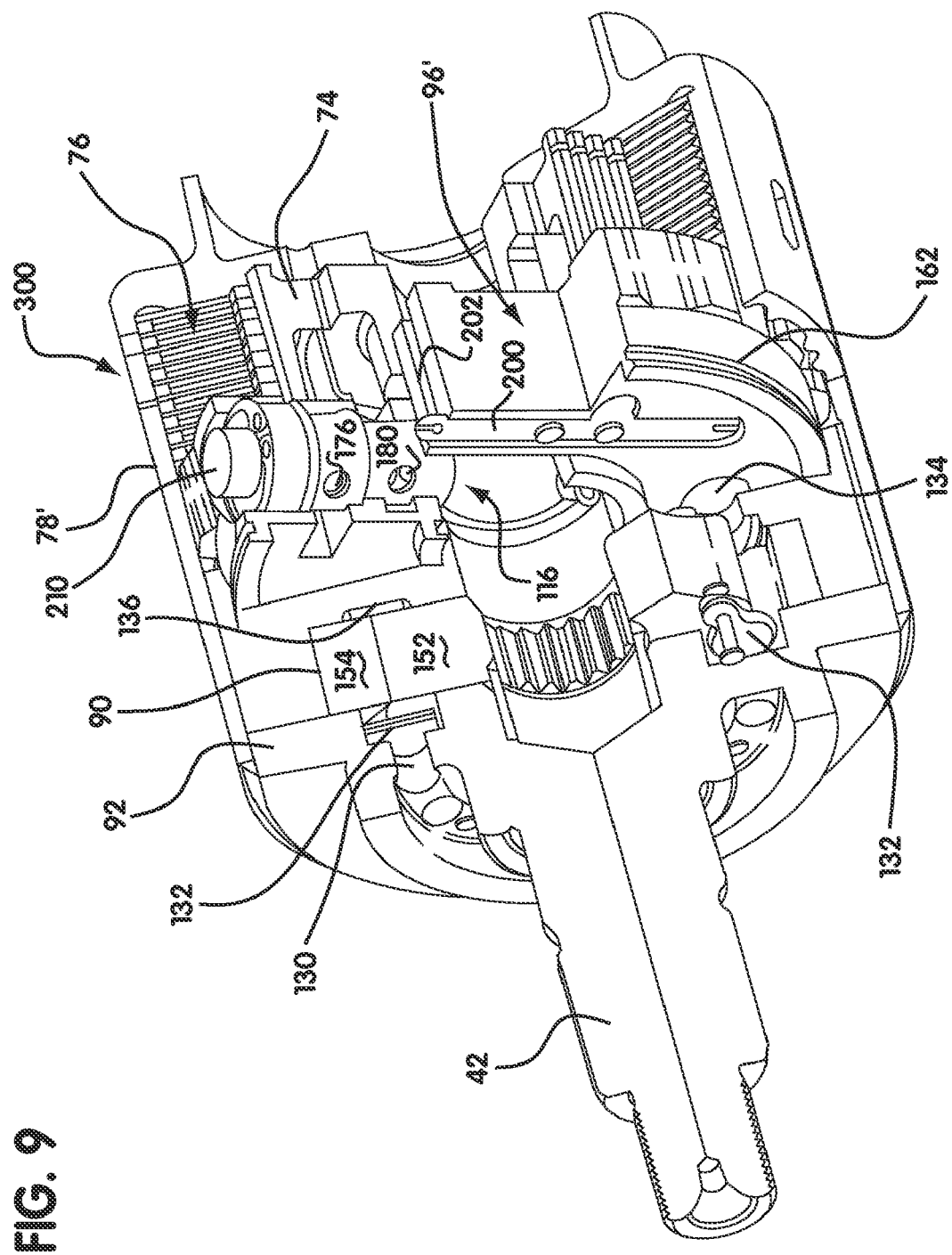
Figure 10:
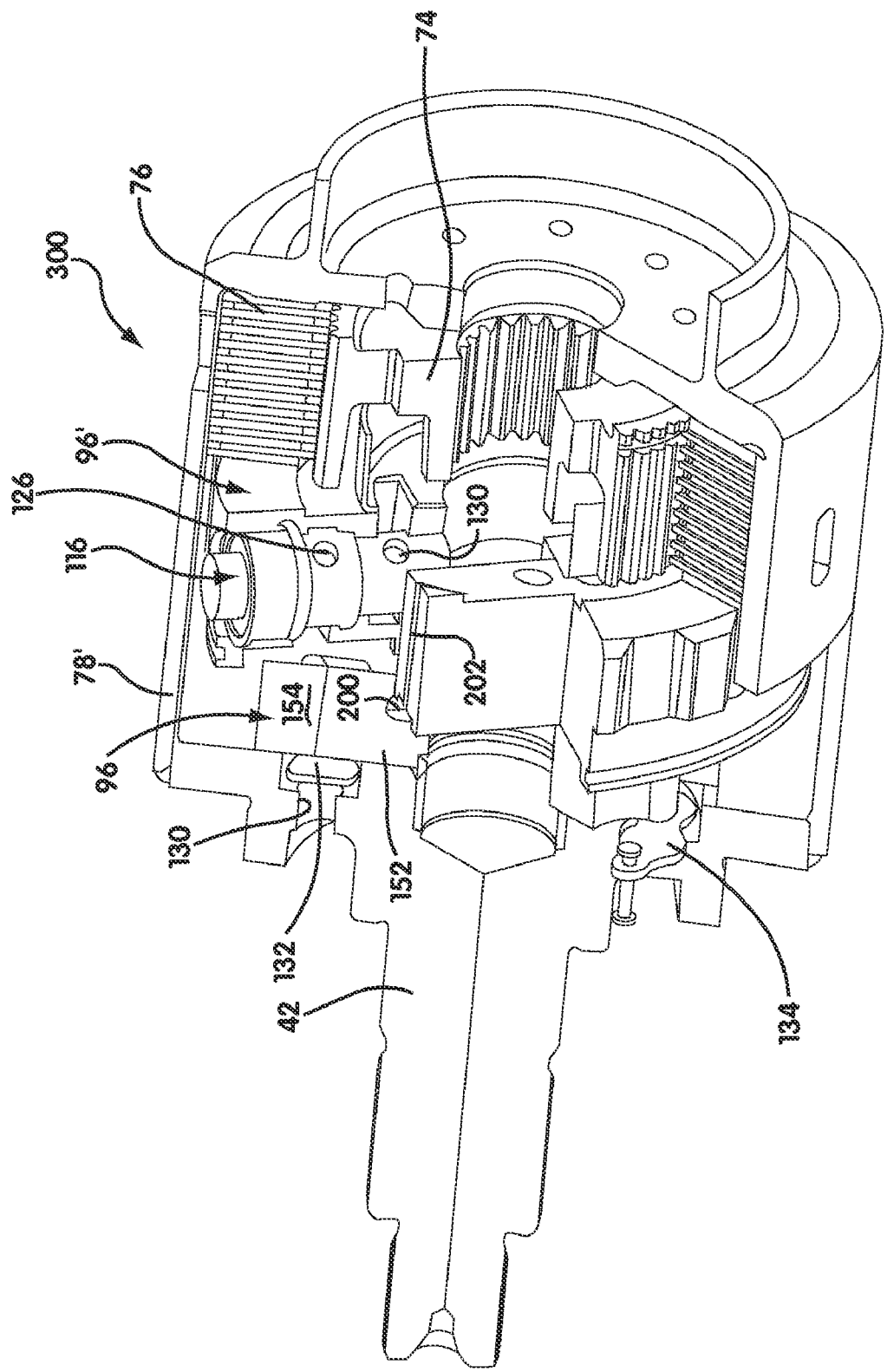

Referring primarily now to FIG. 6, the components of drive module 46 will be described. A drive pinion 220 is formed at the end of pinion shaft 54 and is meshed with a bevel ring gear 222 fixed via bolts 224 to a drive casing 226. An end cap 228 is also fixed via bolts 224 to drive casing 226 and is supported for rotation relative to housing 40 via a bearing assembly 230. A second end cap 232 is formed at the opposite end of drive casing 226 and is rotatably supported on housing 40 via a bearing assembly 234. Bevel gearset 56 includes a pair of pinion gears 236 rotatably supported on opposite ends of pinion shaft 238 that is non-rotatably fixed to drive casing 226 via a retainer screw 240. Gearset 56 further includes a first side gear 242 splined for rotation with first output shaft 58 and a second side gear 244 splined for rotation with second output shaft 60.

Second hydraulic clutch 62 includes a biasing clutch 246 and a clutch actuator 248. Biasing clutch 246 is a multi-plate clutch assembly having a clutch pack 250 of alternately interleaved inner and outer clutch plates that are respectively splined to a clutch hub 252 and drive casing 226. Hub 252 is splined to an axial hub section 254 of first side gear 242. Clutch actuator 248 includes a fluid pump 256 and a piston assembly 258. Pump 256 is a gerotor pump assembly disposed in a pump chamber formed between end cap 228 and a piston housing 260. An eccentric outer ring 262 of gerotor pump 256 and piston housing 260 are fixed for rotation with drive casing 226 via bolts 264. Piston assembly 258 is disposed in a piston chamber 266 formed in piston housing 260. In a preferred construction, piston assembly 258 is similar in structure and function to that of piston assembly 96 such that a control valve (not shown) similar to control valve 116 is used. As seen, seal rings 270 and 272 seal a piston 274 of piston assembly 258 relative to piston housing 260. Assuming that piston assembly 258 is similar to piston assembly 96, the hydraulic circuit shown in FIG. 5 would be applicable to illustrate the operation of second hydraulic coupling 62.

Pump 256 includes a pump ring 280 splined to first output shaft 68, and a stator ring 282 disposed between pump ring 280 and eccentric ring 262. The external lobes of pump ring 280 mesh with the internal lobes of stator ring 282, with stator ring 282 journalled in an eccentric aperture formed in eccentric rig 262. Relative rotation between drive casing 226 and first output shaft 58 generates a fluid pumping action. Check valves 132 are retained in inlet ports formed in end cap 228 while one-way check valves 134 are retained in flow passages formed in piston housing 260 between the outlet of pump 256 and piston chamber 266. A pressure regulator valve is mounted in a by-pass passage through piston 274 to control pressurization of piston chamber 266 so as to allow a limited amount of unrestrained inter-wheel speed differentiation, such as during turns.

This arrangement of an in-line hydraulic coupling between propshaft 78 and pinion shaft 54 permits "on-demand" transfer of drive torque to secondary driveline 16. Thus, all-wheel drive traction control is provided when needed in response to a loss of traction between the front and rear drivelines. Combining the in-line coupling with second hydraulic coupling 62 in drive module 46 provides "front-to-back" and "side-to-side" traction control that is well suited for use in conjunction with a secondary driveline system.

Referring now to FIGS. 7 through 10, a modified version of first hydraulic coupling, identified by reference numeral 300 is shown. Hydraulic coupling 300 is generally similar in structure and function to hydraulic coupling 44, with the exception that piston assembly 96' is now splined to drum 78'. However, the pump valving and operation of control valve 116 are substantially similar.

Figure 11:
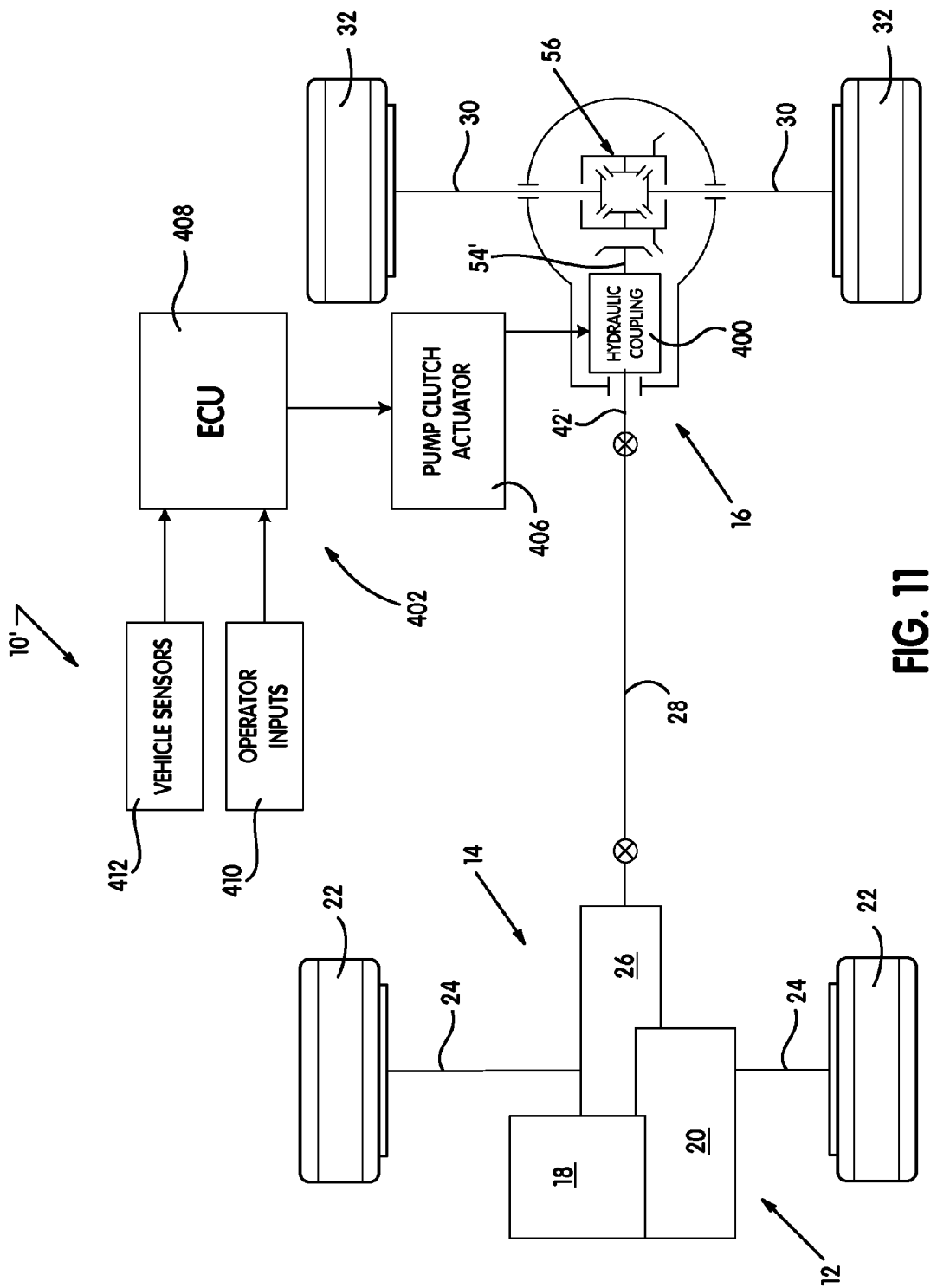
FIG. 11 is a schematic layout of a modified drivetrain arrangement according to yet another embodiment of the present invention.

Referring to FIG. 11, a modified drivetrain 10' for the motor vehicle is shown. Generally, drivetrain 10' is similar to drivetrain 10 of FIG. 1 in that a hydraulic coupling 400 is used to control the transfer of drive torque from an input shaft 42' to a pinion shaft 54'. However, a control system 402 is now provided for controlling selective operation of hydraulic coupling 400. As will be detailed, hydraulic coupling 400 is equipped with a pump clutch 404 that functions to selectively couple a rotary pump component to pinion shaft 54' and a pump clutch actuator 406 for controlling selective actuation of pump clutch 404. Control system 402 includes an electronic control unit (ECU) 408 that is operable to receive input signals from operator inputs 410 and vehicle sensors 412, generate control signals based on these input signals, and output the control signals to pump clutch actuator 406.

Figure 12:
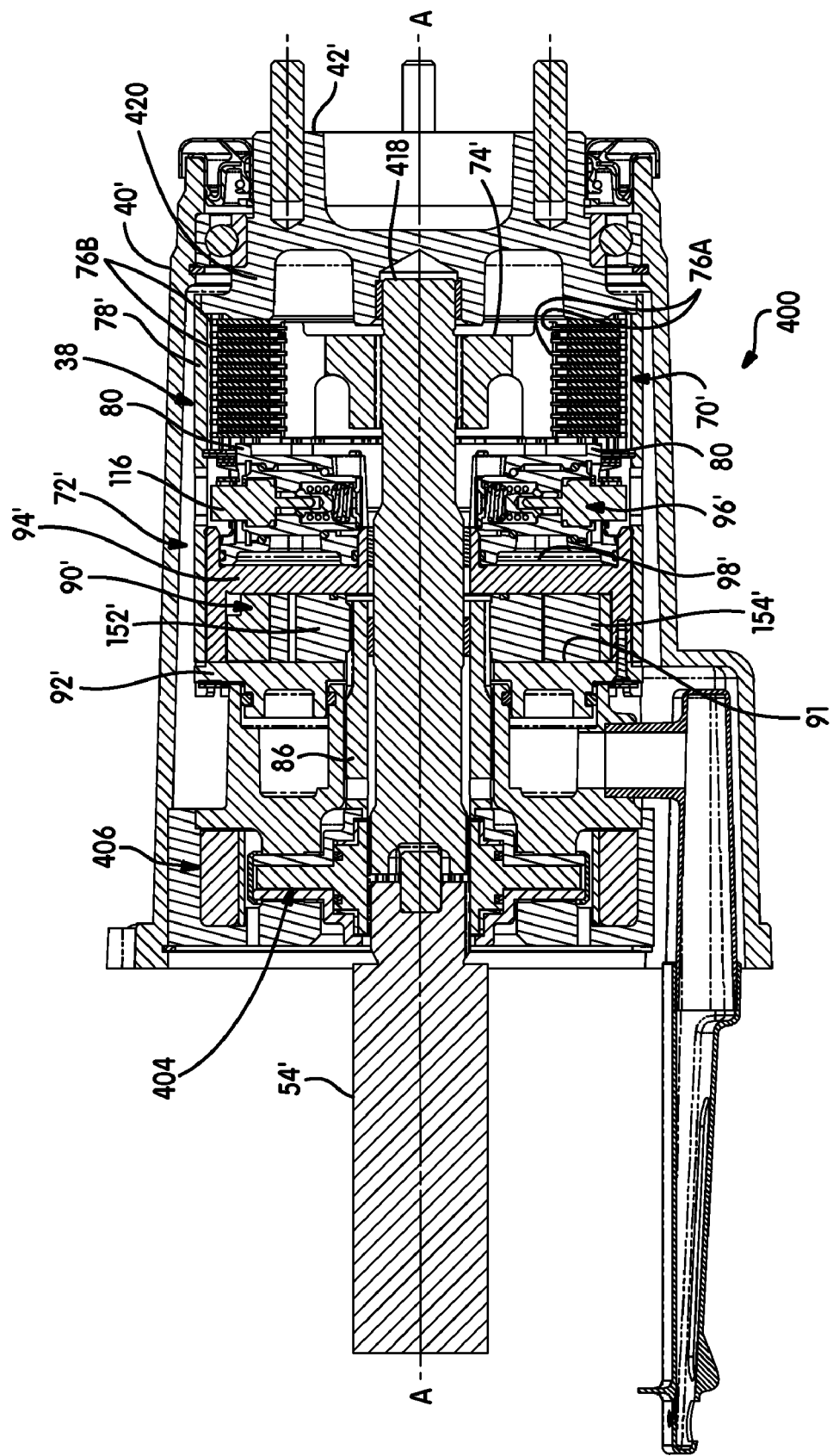
FIG. 12 is a sectional view of a hydraulic coupling adapted for use with the drivetrain shown in FIG. 11.
Figure 13:
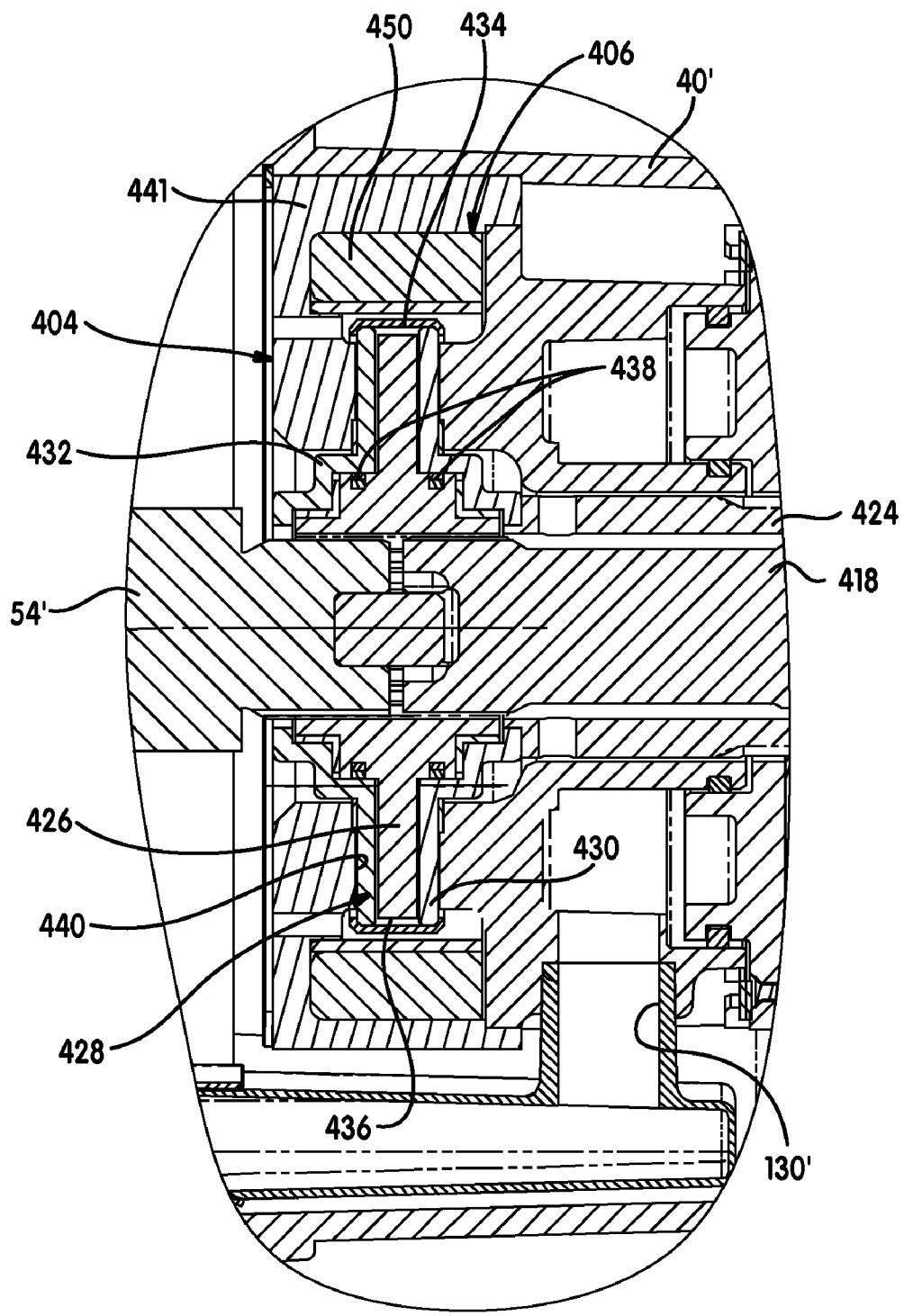
FIG. 13 is an enlarged partial sectional view the hydraulic coupling shown in FIG. 12.

Referring primarily to FIGS. 12 and 13, hydraulic coupling 400 is shown to include many of the components and sub-assemblies of hydraulic coupling 44 with such being identified with a "primed" common reference numeral. Specifically, hydraulic coupling 400 includes a friction clutch 70' and a clutch actuator 72'. Friction clutch 70' includes a clutch pack of inner plates 76A and outer plates 76B operably disposed between hub 74' and drum 78'. Hub 74' is shown to be coupled (splined) to an intermediate shaft 418 which, in turn, is coupled for common rotation with pinion shaft 54'. Drum 78' is fixed at one end to a pump housing 92' and at its opposite end to an end plate 420 that is coupled for common rotation with input shaft 42'. Clutch actuator 72' includes a fluid pump 90' disposed in a pump chamber 91 formed between pump housing 92' and a piston housing 94', and a piston assembly 96' retained in a piston chamber 98' formed in piston housing 94'.

Piston assembly 96' is axially moveable to apply a compressive clutch engagement force on the clutch pack. As noted previously, the amount of drive torque transferred from input shaft 42' to pinion shaft 54' is proportional to the magnitude of the clutch engagement force which, in turn, is a function of the fluid pressure generated by pump 90' and supplied to piston chamber 98'. As will be understood by those skilled in this art, the fluid distribution and valving arrangement shown in FIG. 5 is again applicable for hydraulic coupling 400, particularly since piston assembly 96' is still equipped with a multi-function control valve 116.

Pump 90' is operable for pumping hydraulic fluid from sump 106 into piston chamber 98' to actuate friction clutch 70'. Similar to pump 90, pump 90' is a bi-directional gerotor pump having a pump ring 152' and an eccentric stator ring 154' retained in an eccentric chamber formed in a pump housing 92'. However, in contrast to pump 90 of hydraulic coupling 44, pump 90' can be selectively shifted between a first or "operative" state and a second or "inoperative" state to control the pressure of the fluid delivered to piston chamber 98' independent of the rotary speed differential between input shaft 42' and pinion shaft 54'. In particular, hydraulic coupling 400 is equipped with pump clutch 404 and pump clutch actuator 406 to provide this enhanced control feature.

Pump clutch 404 includes a tubular pump hub 424 surrounding intermediate shaft 418 that is fixed via a splined connection to pump ring 152', a clutch rotor 426 fixed via a splined connection to both intermediate shaft 418 and pinion shaft 54', and a clutch housing 428. Clutch housing 428 includes a first clutch ring 430 fixed for rotation with pump hub 424, a second clutch ring 432, and an end cap 434 interconnecting first and second clutch rings 430 and 432 for common rotation. As seen, clutch housing 428 defines an annular chamber 436 within which clutch rotor 426 is disposed with a pair of seals 438 arranged to enclose chamber 436. A volume of a variable viscosity fluid is provided within chamber 436. As further seen, clutch housing 428 is supported for rotation in an annular chamber 440 formed in an actuator housing 441 that is non-rotatively fixed to housing 40'. Actuator housing 441 functions to non-rotatably support pump clutch actuator 406 and rotatably support pump housing 92' while defining a suction side inlet chamber 130' therewith.

In operation, pump clutch 404 is operably shifted between its operative state and its inoperative state based on the viscosity of the fluid in chamber 436. With clutch pump 404 in its operative state, clutch housing 428 is coupled for common rotation with clutch rotor 426, thereby causing pump ring 152' to be commonly driven with pinion shaft 54'. As such, the fluid pressure supplied by pump 90' to piston chamber 98' is a direct function of the relative rotation between input shaft 42' and pinion shaft 54'. In contrast, with pump clutch 404 in its inoperative state, clutch housing 428 is disengaged from clutch rotor 426 such that pump ring 152' is not driven. Accordingly, pump 90' does not generate any pumping action and friction clutch 70' is released. Obviously, pump clutch 404 can also function in a partially engaged mode with slip permitted between driven clutch rotor 426 and clutch housing 428 so as to permit adaptive regulation of the fluid pressure generated by fluid pump 90'.

The degree of engagement of pump clutch 404 is based on the viscosity of the fluid. The fluid viscosity can vary between a low viscous state and a high viscous state. In the low viscous state, the shear force of the fluid is low and relative rotation between clutch rotor 426 and clutch housing 428 is enabled because there is virtually no viscous drag therebetween. In the high viscous state, the shear force of the fluid is at its highest inducing viscous drag from clutch rotor 426 to clutch housing 428. In this manner, clutch housing 428 is induced to rotate at the same rotational speed as clutch rotor 426. In a partially viscous state (i.e., between low and high), the shear force of the fluid is sufficient to provide a degree of viscous drag.

The variable viscosity fluid is preferably an electrorheological (ER) or magnetorheological (MR) fluid that has a viscosity which can be varied based on the magnitude of an electric current flowing therethrough. ER and MR fluids are known in the art and therefore, a more detailed description is not required. An electric coil 450 associated with clutch actuator 406 is provided to selectively induce eddy currents. More specifically, as a current signal is applied to electric coil 450, eddy currents are generated. The strength of the eddy currents is based on the strength of the current signal. The stronger the current signal, the stronger the eddy currents and the more viscous the fluid is. The weaker the current signal, the weaker the eddy currents and the less viscous the fluid is.

In operation, control system 402 normally provides a continuous current signal to electric coil 450 thereby fully engaging pump clutch 404. In this manner, pump 90' pressurizes the fluid and induces engagement of the clutch pack whenever there is a difference in the rotational speed of input shaft 42' and pinion shaft 54'. In some instances, particularly for traction and/or stability control, control system 402 drops the current signal to instantaneously disengage pump clutch 404. In this manner, pump 90' is unable to pressurize the fluid and engage friction clutch 70', regardless of the existence of a rotational speed difference between input shaft 42' and pinion shaft 54'. Control system 402 can also regulate the strength of the current signal to vary the viscosity of the fluid. In this manner, control system 402 regulates pumping action of pump 90' whenever there is a difference in the rotational speed of the input shaft 42' and the pinion shaft 54'.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transfer assembly for use in a motor vehicle to transfer drive torque from a powertrain to a driveline, comprising:
    a coupling having a first rotary member driven by the powertrain, a second rotary member driving the driveline, a transfer clutch operably disposed between the first rotary member and the second rotary member, a piston disposed in a piston chamber and actuatable to engage the transfer clutch for transferring drive torque from the first rotary member to the second rotary member, and a fluid pump for pumping hydraulic fluid into the piston chamber;
    a pump clutch for selectively coupling the fluid pump to one of the first and second rotary members; and
    a control system for selectively actuating the pump clutch.

2. The power transfer assembly of claim 1 wherein the pump clutch is operable for selectively coupling a pump component of the fluid pump for rotation with a corresponding one of the first and second rotary members, and wherein the control system is operable for selectively shifting the pump clutch between an engaged state and a disengaged state.

3. The power transfer assembly from claim 2 wherein the pump clutch is operable in its engaged state to couple the pump component for rotation with the corresponding one of the first and second rotary members so as to cause the fluid pump to generate a pumping action and pump hydraulic fluid into the piston chamber, and wherein the pump clutch is operable in its disengaged state to release the pump component and interrupt the pumping action of the fluid pump.

4. The power transfer assembly from claim 1 wherein the pump clutch includes a pump hub fixed to a pump component of the fluid pump, a clutch rotor fixed to the corresponding one of the first and second rotary members, and a clutch ring fixed for rotation with the pump hub, and an actuator for selectively coupling the clutch rotor and the clutch ring.

5. The power transfer assembly from claim 4 wherein the actuator includes an electromagnetic coil and a variable viscosity fluid retained in a clutch chamber formed between the clutch rotor and the clutch ring, and wherein the pump clutch is engaged by the induction of current through the electromagnetic coil interacting with variable viscosity fluid.

6. A power transfer assembly for use in a motor vehicle to transfer drive torque from a powertrain to a driveline, comprising:
    an input shaft adapted to be driven by the powertrain;
    an output shaft adapted to drive the driveline;
    a hydraulic coupling including a transfer clutch operably interconnecting the input shaft and the output shaft, a clutch operator selectively operable to engage the transfer clutch, a fluid pump for selectively pumping fluid to the clutch operator, a pump clutch for selectively coupling the fluid pump to one of the input shaft and the output shaft, and a pump clutch actuator for controlling actuation of the pump clutch; and
    a control system for controlling actuation of the pump clutch actuator.

7. The power transfer assembly of claim 6 wherein the fluid pump includes a pump member and the pump clutch is operable for coupling the pump member for rotation with the corresponding one of the input shaft and the output shaft.

8. The power transfer assembly of claim 7 wherein the pump clutch includes a first clutch member fixed for rotation with the pump member of the fluid pump, and a second clutch member fixed for rotation with the corresponding one of the input shaft and the output shaft, and wherein the pump clutch actuator is operable to control engagement between the first and second clutch members.

9. The power transfer assembly of claim 8 wherein the pump clutch actuator includes an electromagnet operable under the control of the control system to vary the viscosity of a fluid in a clutch chamber formed between the first and second clutch members.

10. The power transfer assembly of claim 8 wherein the variable viscosity fluid is one of a magnetorheological fluid or an electrorheological fluid.

11. The power transfer assembly of claim 6, further including a differential gearset and a differential housing, wherein the hydraulic coupling and the differential gearset are positioned within the differential housing.

12. A power transfer assembly for use in a motor vehicle to transfer drive torque from a powertrain to a driveline, comprising:
- an input shaft;
- an output shaft;
- a case;
- a transfer clutch operably interconnecting the input shaft and the output shaft;
- a clutch operator selectively operable to engage the transfer clutch;
- a fluid pump for selectively pumping fluid to the clutch operator;
- a pump clutch for selectively coupling the fluid pump to one of the input shaft and the output shaft;
- a pump actuator; and
- a control system for controlling actuation of the pump actuator, wherein each of the transfer clutch, clutch operator, fluid pump, pump clutch, and pump actuator are positioned within the case.

13. The power transfer assembly of claim 12 wherein the pump clutch is operable for selectively coupling a pump component of the fluid pump for rotation with a corresponding one of the input shaft and the output shaft, and wherein the control system is operable for selectively shifting the pump clutch between an engaged state and a disengaged state.

14. The power transfer assembly of claim 12 further including a controller in receipt of a signal indicative of a vehicle operating condition, wherein the controller controls the pump actuator based on the vehicle operating condition.

15. The power transfer assembly of claim 14 wherein the controller receives an input signal from at least one of an operator and a vehicle sensor.

16. The power transfer assembly of claim 12 wherein the pump actuator controls the pump clutch to regulate the output of the fluid pump.

17. The power transfer assembly of claim 12 wherein the pump clutch is operable as a slip clutch such that the input shaft is capable of rotating at a speed greater than a pumping member of the pump.

18. A hydraulic coupling, comprising:
- first and second rotary members;
- a friction clutch operably disposed between said first and second rotary members;
- a clutch operator for engaging said friction clutch;
- a fluid pump for controlling movement of said clutch operator relative to said friction clutch;
- a pump clutch operable in a first mode for selectively shifting said fluid pump into an operative state and operable in a second mode for shifting said fluid pump into an inoperative state; and
- a control system for controlling actuation of said pump clutch.

19. The hydraulic coupling of claim 18 wherein said fluid pump includes a rotary pump component, and wherein said pump clutch includes a first clutch component fixed for rotation with said first rotary member and a second clutch component fixed for rotation with said pump component, said pump clutch is operable in its first mode to inhibit rotation of said first clutch component relative to said second clutch component so as to cause said first rotary member to drive said pump component and actuate said fluid pump, said pump clutch is operable in its second mode to permit relative rotation between said first and second clutch components so as to release said pump component from driven connection with said first rotary member and de-actuate said fluid pump.

20. The hydraulic coupling of claim 19 further comprising a pump clutch actuator for shifting said pump clutch between its first and second modes in response to a control signal from a controller associated with said control system.

21. The hydraulic coupling of claim 20 wherein said pump clutch actuator includes an electromagnet operable in response to said control signal to vary the viscosity of a variable viscosity fluid disposed in a clutch chamber defined between said first and second clutch components.

22. The hydraulic coupling of claim 18 wherein said friction clutch includes a multi-plate clutch pack, wherein said clutch operator includes a piston disposed in a piston chamber for movement relative to said clutch pack so as to exert a clutch engagement force thereon, wherein said fluid pump is operable for pumping fluid from a sump to said piston chamber when operating in its operative state, and wherein said pump clutch includes a first clutch component fixed for rotation with said first rotary member, a second clutch component fixed for rotation with a rotary pump component of said fluid pump, and a pump clutch actuator for shifting said pump clutch between its first and second modes.

23. The hydraulic coupling of claim 22 wherein said pump clutch actuator is operable for controllably varying the viscosity of a variable viscosity fluid located between said first and second clutch components in response to a control signal from a controller associated with said control signal so as to control the fluid pressure supplied to said piston chamber.

24. A power transfer assembly for use in a motor vehicle to transfer drive torque from a powertrain to a driveline, comprising:
- a coupling having a first shaft driven by the powertrain, a second shaft driving the driveline, a transfer clutch operably disposed between said first shaft and said second shaft, a piston disposed in a piston chamber and actuatable to engage said transfer clutch for transferring drive torque from said first shaft to said second shaft, a fluid pump for pumping hydraulic fluid from a sump to said piston chamber, and a pump clutch for selectively coupling said fluid pump to one of said first and second shafts; and
- a control system for selectively actuating said pump clutch.

25. The power transfer assembly of claim 24 wherein said fluid pump includes a pump member and said pump clutch is operable for coupling said pump member for rotation with said first shaft.

26. The power transfer assembly of claim 25 wherein said pump clutch includes a first clutch member fixed for rotation with said pump member of said fluid pump, a second clutch member fixed for rotation with said first shaft, a clutch chamber defined between said first and second clutch members and a variable viscosity fluid within said clutch chamber, and wherein said coupling further comprises a clutch actuator operable under the control of said control system to vary the viscosity of said fluid in said clutch chamber.

27. A power transfer assembly for use in a motor vehicle to transfer drive torque from a powertrain to a driveline, comprising:
- an input shaft adapted to be driven by the powertrain;
- an output shaft adapted to drive the driveline;
- a hydraulic coupling including a transfer clutch operably interconnecting said input shaft and said output shaft, a clutch operator selectively operable to engage said transfer clutch, a fluid pump for selectively pumping fluid to said clutch operator, a pump clutch for selectively coupling said fluid pump to one of said input and output shaft, and a pump actuator; and a control system for controlling actuation of said pump actuator.

28. The power transfer assembly of claim 27 wherein said fluid pump includes a pump member and said pump clutch is operable for coupling said pump member for rotation with said input shaft.

29. An all-wheel drive vehicle, comprising:

a first driveline including a first differential interconnecting a pair of primary wheels;

a second driveline including a second differential interconnecting a pair of second wheels;

a powertrain for delivering drive torque to said first differential;

a power take-off unit driven by said powertrain; and a torque transfer mechanism for transferring drive torque from said power take-off unit to said second differential, said torque transfer mechanism including an input member driven by said power take-off unit, an output member driving said second differential, a transfer clutch operably disposed between said input and output members, a piston disposed in a pressure chamber and moveable therein to engage said transfer clutch for transferring drive torque from said input member to said output member, a fluid pump for pumping hydraulic fluid from a sump to said pressure chamber, a pump clutch for selectively coupling said fluid pump to one of said input and output members, a pump clutch actuator for controlling actuation of said pump clutch, and a control system for controlling actuation of said pump clutch actuator.

* * * * *